Figure 1:
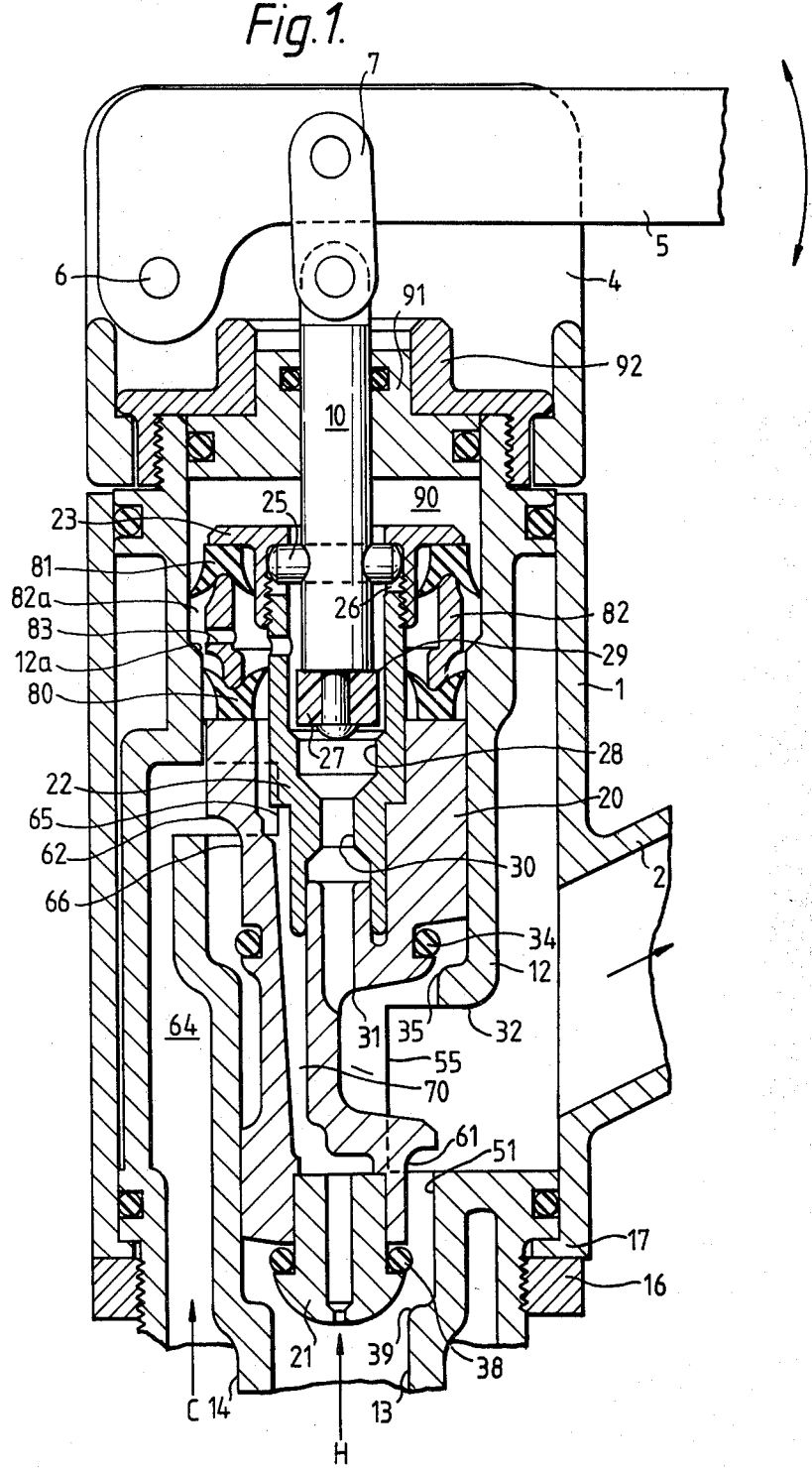

United States Patent [19]
Goldsmith

[11] 4,429,715
[45] Feb. 7, 1984

[54] FLUID FLOW CONTROL VALVE

[75] Inventor: Derek J. Goldsmith, Sevenoaks, England

[73] Assignee: Goldsmith Patent Holdings (Sevenoaks) Limited, Westerham, England

[21] Appl. No.: 365,590

[22] Filed: Apr. 5, 1982

[30] Foreign Application Priority Data

Apr. 10, 1981 [EP] European Pat. Off. ........ 81301592.2

[51] Int. Cl.³ .............................................. F16K 11/02
[52] U.S. Cl. .................. 137/625.17; 251/38; 251/51
[58] Field of Search ............. 137/625.17, 625.18, 137/625.4; 251/35, 38, 43, 45, 50, 51

[56] References Cited

U.S. PATENT DOCUMENTS

| 2,547,254 | 4/1951 | Braithwaite | 137/625.17 |
| 2,708,092 | 5/1955 | Smith | 251/38 X |
| 2,712,324 | 7/1955 | Lund | 251/38 X |
| 4,241,759 | 12/1980 | Billeter | 251/38 X |
| 4,245,813 | 1/1981 | Grenier | 251/45 X |

Primary Examiner—Alan Cohan
Assistant Examiner—John A. Rivell
Attorney, Agent, or Firm—Fleit, Jacobson, Cohn & Price

[57] ABSTRACT

A mixing valve for hot and cold domestic water has a control member (20,22 and 23) movable within a body (12) whereby axial movement of the control member controls opening and closing of communication from hot and cold inlets (13 and 14) to an outlet (32, 2) and rotation of the control member controls the relative proportions of fluid flow from respective inlets to the outlet. A pressure chamber (90) is supplied with pressure fluid from the inlets for assisting closing action of the valve upon closure of a vent (28,30) from the pressure chamber. In order to resist pressure surges at either inlet a restricted aperture (83) is provided to reduce flow from a reducing volume movement damping chamber towards the end of closing movement of the valve control member to prevent the final portion of the valve closing movement being too sudden.

21 Claims, 3 Drawing Figures

FLUID FLOW CONTROL VALVE

DESCRIPTION

This invention relates to an improved fluid flow control valve and is more especially concerned with the provision of an improved version of the mixing valve shown in British Patent specification No. 1498731.

Such mixing valves are used domestically for controlling the flow of water to sinks, baths, showers and the like where two flows of hot and cold water are mixed for discharge from a single outlet.

While the valve shown in the above mentioned patent specification works adequately for many purposes it can give difficulties if required to be capable of operating with both low and high pressure water supplies.

While various proposals have been made, for example in British Patent specification Nos. 882394, 1388423, 1388424 and 1500910, for the use of restricted flow of liquid from a closed chamber to prevent over-rapid closing of a valve, and for a balanced pressure effect on the valve when open, none have provided a valve in which there is a zero-action to assist actuation of the valve and in which supply pressure is used positively to hold the valve closed.

According to the present invention there is provided a fluid flow control valve comprising a body having two inlet ports and at least one outlet communicating with a chamber therein, and a control member axially movable within the chamber for opening and closing communication from the inlet ports to outlet and rotatable to control the relative rates of flow through the individual inlet ports, characterized by the provision of fluid pressure-responsive one way valving means operable by supply fluid pressure from at least one of the inlet ports to a pressure chamber the fluid pressure in which is operable to urge the control member towards a fluid flow closing position for providing a servo action to assist axial movement of the control member from a position in which both inlet ports are in open communication with outlet to a position in which there is no communication from either inlet port to outlet, one way valving means providing for fluid communication from each of the inlets to the pressure chamber.

By providing a closable vent from the pressure chamber to outlet, closable means for closing the vent permit the vent to be closed in a shut-off position of the valve whereby fluid pressure in the pressure chamber positively holds the control member in its closed flow preventing position regardless of the static pressure in either inlet.

Preferably the one-way valving means comprises an annular cup seal permitting fluid to flow therepast in one direction only. Conveniently the annular cup seal may have radially inner and outer lips cooperating with an internal surface of the body chamber and an external surface of the fluid control member to permit fluid flow from the respective inlets to the pressure chamber whereby the servo chamber pressure will be supplied by the higher of the pressures from the two inlets. In order to assist opening of the valve the arrangement can be such that inlet pressure is operable to urge the fluid flow control member to a valve opening position when the servo pressure chamber is vented to outlet.

When the valve is working with high pressure inlet fluid, for example in the ground floor of a tall block of flats, it is important that the final act of closing the communication from inlets to outlet should not take place too quickly otherwise sudden pressure surges and water-hammer can result. Preferably, therefore, fluid pressure control means are provided for resisting rapid movement of the control member to its flow closing position at least towards the end of its travel to such position. Conveniently these fluid pressure control means can be provided by having a damping chamber defined between the housing and the control member such that movement of the control member in its closing position reduces the volume of such damping chamber. A discharge aperture from the chamber is so arranged as to permit a restricted flow only of liquid from the damping chamber towards the end of closing movement of the control member. Such damped liquid flow through the aperture ensures that, during final closing, movement of the control member itself is resisted.

It can be a statutory requirement that where a mixing valve is provided with mains water at one inlet and domestic hot water at the other inlet there should be no chance of mixing taking place before the flows leave the valve in order to prevent any chance of contamination of the mains water from the domestic water. The control valve of the present invention can readily be adapted to meet such requirements by providing two outlets with a seal being provided between the body and the fluid flow control member between the outlets whereby mixing of the fluids from the two inlets is prevented prior to separate discharge through the respective ones of the outlet.

Figure 2:
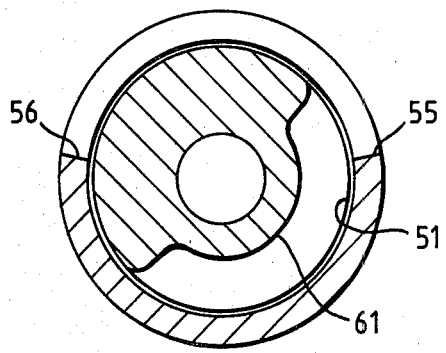
Figure 3:
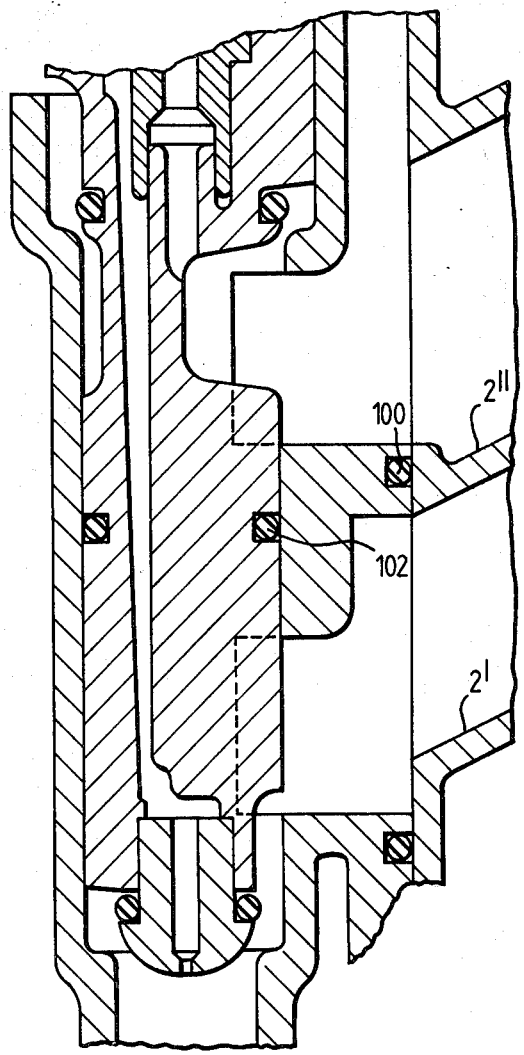

The invention will be further described, by way of example, in the accompanying drawings wherein:

FIG. 1 is a diagrammatic longitudinal sectional view of a fluid flow control mixing valve embodying the invention;

FIG. 2 is a cross-sectional view of a detail showing the cooperation between an outlet port and the control member whereby the rotation of the control member can adjust the flow from one inlet to that outlet port; and FIG. 3 is a view similar to part of FIG. 1 but showing an alternative embodiment of the invention which has been modified whereby mixing of the fluid streams will only be permitted externally of the valve.

FIG. 1 illustrates a domestic mixing valve having an external housing 1 provided with an outlet 2 with, mounted on top thereof, a control mechanism comprising a rotary knob 4 carrying an operating lever 5 mounted to the knob for pivotal movement by a pin 6. The arm 5 is connected by a link 7 to the upper end of the control rod 10 which operates, as will be described, so that axial movement of the control rod will control the opening and closing of the valve with the relative proportions of hot and cold water being controlled by the rotational position of the control rod.

The valve itself comprises a body 12 provided with a hot water inlet 13 and a cold water inlet 14 at its lower end. Axially and rotationally movable within the chamber confined within the body 12 is a fluid flow control member comprised by an assembly of parts shown at 20, 21 and 22 in FIG. 1. A flanged nut 23 is threaded to the top end of the part 22 and retains the opposite ends of a pin 25 extending diametrically through the rod 10 in diametrically opposed axially extending slots 26 defined in the end of the part 22. This pin provides a rotary drive from the rod 10 to the control member and is also capable of limited axial movement relative to the control member through a distance limited by the axial ends of the slots 26 receiving the ends of the pin 25.

A seal provided by an elastomeric plastics ring 27 is mounted at the lower end of the control rod 10 and is sealingly receivable in a bore 28 in the control member communicating via a vent passage 30 to a vent opening 31 communicating with the outlet. A radially projecting shoulder 29 is provided by the rear of the seal ring 27 for a purpose to be explained. In an alternative arrangement, not illustrated, instead of the elastomeric plastics seal ring 27 of rectangular longitudinal cross section, an O-ring seal may be used mounted in an end position of the rod 10 of slightly greater diameter than the major portion of the rod in order to provide a shoulder to function in the same manner as the shoulder 29.

The valve is shown in its open condition and is closable by an O-ring seal 38 being received in the end 39 of the hot water inlet bore 13 and by O-ring seal 34 being received within a bore 35 controlling flow of water from the cold inlet. The outlet port 55 from the body 12 has, as shown in FIG. 2, two boundary edges 55 and 56 and cooperable with this port is a cutout defined by an arcuate surface 61 whereby water from the inlet 13 with the valve open will flow along the space defined by a bore 51 and the surface of the cutout before being deflected at the end of the surface 61 through the portion of the outlet port exposed. Thus in the condition shown in FIG. 2 as the control member is rotated in an anticlockwise direction a larger proportion of the outlet port is exposed to permit readier flow therethrough of water from the hot water inlet.

The cold water inlet 14 communicates via a passage 64 with an inlet port 62 having an edge 65 corresponding with the edge 56 of the outlet port cooperating with a cutout surface 66 similar in shape to the surface 61. The cutouts providing the control surfaces 61 and 66 are so arranged that automatically upon rotation of the control member closing movement between the surface 65 and the cutout 66 to restrict the flow of cold water therebetween will correspond with opening movement for hot water flow controlled by the cutout surface 61 and vice versa whereby the rotational position of the control member will define the relative proportions of hot and cold flow permitted. This operation is generally similar to that disclosed in the earlier British Pat. No. 1,498,731 referred to above and is generally similar thereto although in the illustrated construction of FIG. 2 a larger cutout is illustrated herein as being suitable for low pressure water supplies. This operates in a manner similar to that of the previous patent with the exception that it does not give the linear response which is possible with the arcuate eccentric surface disclosed in FIG. 4 of the British Pat. No. 1,498,731. When the valve is to be used with water supplies in which the cold water supply is at a very much higher pressure than the hot water it may be desired to provide a further metering outlet similar to the surface 61 only on the cold water outlet side so that the higher pressure cold water supply would pass through two metering locations as compared with the single metering location provided for the hot water supply.

The housing is shown provided with the flange 17 clamped between a portion of the body member 12 and a nut 16 threaded thereonto. At the upper end a pressure chamber 90 within the body member is closed at the top by a closure disc 91 sealed to the interior surface of the body member and to the exterior surface of the control rod 10. The closure disc 91 is retained in position by a nut 92 which is provided with a flange also to retain in position the rotary knob 4.

Two annular cup seals 80 and 81 facing in opposite directions are provided with their inner and outer peripheral sealing lips sealing against the outer surface of the control member and the inner surface of the bore within the body. The seal construction is such that leakage of pressure fluid from the cold inlet passage 64 can readily leak past the outer peripheral edge of the seal 80 into a chamber defined between the facing annular seals which are held apart by a spacer ring 82. Similarly water pressure from the passage 70 can pass the inner lip of the seal 80 into the same chamber. Communication is provided between this chamber and a central bore in the member 22 and thence to the pressure chamber 90. As will be noted the portion of the internal bore of the body engaged by the outer peripheral surface of the seal 81 has a diameter greater than the bore engaged by the outer peripheral edge of the seal 80 for a purpose to be explained. The lips of the seal 80 serve to prevent reverse flow from the pressure chamber 90 to either inlet. Consequently with the vent closed the pressure in the pressure chamber will be that of the higher one of the inlet pressures.

With a valve open as shown with the seal 27 spaced from the bore 28 the pressure chamber 90 communicates with outlet whereby the pressure therein is relieved. Accordingly there is a pressure balance from the inlets urging the control member upwardly to hold the valve in its open position. Pressure fluid leaking past the seal 80 will vent automatically to outlet.

Where it is desired to close the valve the lever is depressed to push the rod 10 axially downwardly. This movement will close the seal 27 against the surface 28 so that the chamber 90 is no longer vented to outlet. Pressure fluid leaking past the seal 80 will then enter the pressure chamber to provide a pressure biasing the valve closure member downwardly towards a closed position with such movement being assisted by such force as is applied through the lever 5 urging the crosspin 25 against the lower edges of the slots 26. When the valve is in its fully closed position with the seal 34 engaged in the bore 35 and the seal 38 engaged in the bore 39 the balance of forces are such that the pressure in the chamber 90 will hold the control member in its closed position. The rod 10 is itself held in its downward position by the pressure force acting on the shoulder 29 from the chamber 90, the bore 28 communicating with outlet. Upon lifting the control rod 10 the seal 27 is removed from the seat 28 to relieve the pressure in the chamber 90 to outlet whereby the inlet and outlet pressure will assist in raising the control member to its valve open position. As indicated, rotation of the control rod by movement of the arm 5 and knob 4 will vary and control the relative proportions of hot and cold fluid transmitted to the outlet.

Reverting to closure of the control valve, means are provided to prevent sudden complete closure of the valve which could cause surge and water-hammer at the inlet, especially when working under high pressure conditions. Thus it will be noted that the chamber 82a radially outwardly of the annular spacer 82 will contract in volume as, during closing movement of the control member, the spacer 82 passes the chamfered ledge 12a. During this closure the fluid trapped therein will escape through the aperture 83 with movement of the control member being resisted by the damping caused by this aperture of limited diameter. The arrangement is such that the aperture 83 starts itself to be progressively closed off just before the opening past the inlet 65 is closed which itself takes place just before final closing of the valve by the seals 34 and 38 seating at 35 and 39 respectively. As the vent 83 is part closed by the ledge 12a the further restriction provides increased damping on closing movement of the control valve with a consequence that upon a person shutting the control valve quickly by pressing on the lever 5 the final closing movement is slowed and delayed sufficiently to contain the risk of damaging pressure surges and water-hammer being caused in the inlet due to rapid closing. Instead of the cup seal 81 an O-ring seal can be used to seal against the peripheral surface of the chamber 82a. With such a construction the spacer ring 82 and flanged nut 23 can be formed as a single member mounting the O-ring seal. Also, instead of having the metering apertures 83 free communication can be provided between the chamber 82a and the space between the spacer ring 82 and the outer periphery of the member 22, the metering restriction instead being provided through the member 22 to restrict flow of fluid to the vent bore 28, 30.

FIG. 3 illustrates part of the valve very similar to that of FIG. 1 with the only difference being that two outlets 2' and 2" are provided with a seal 100 being provided between the body and the housing to separate the two outlets and with a seal 102 being provided between the control member and the body to separate the two outlets. With this arrangement the valve operates generally as in FIG. 1 with the only exception being the separation of flows from the two inlets to separate outlets. If desired the vent 30 may be arranged to discharge into the further outlet rather than the nearer outlet as shown in FIG. 3. Normally it will be so arranged as to discharge into that outlet which is used for the discharge of hot water so as to avoid any possibility of contamination of the cold water with vented water from the pressure chamber 90.

Conveniently the body 12 and the parts 20, 21 and 22 of the flow control member can be moulded from plastics material. Preferably the flow control member parts are moulded from polyacetal resin containing polytetrafluoroethylene as a filter while the body 12 may be moulded from nylon. Because of the low-friction characteristics of polytetrafluoroethylene, in particular the fact that its coefficient of static friction is less than its coefficient of dynamic friction, it is possible to have a tight interference fit between the control member parts and the body with consequent advantages of good play-free feel and the provision of good resistance to leakage quite apart from the provision of the various seals. More importantly, however, the tight fit prevents the ingress of solid particles of foreign matter between sliding surfaces with a consequent resistance to wear when the valve is being used to control the flow of water which is not clean and free of contaminating solid particles.

I claim:

1. A fluid flow control valve comprising a body defining a chamber therein and having two inlet ports and at least one outlet port communicating with said chamber therein; a control member axially movable within the chamber to open and close communication from the inlet ports to outlet and rotatable to control the relative rate of flow through the individual inlet ports; and fluid pressure responsive means operable by supply fluid pressure from at least one of the inlet ports for providing a servo action to assist axial movement of the control member from a position in which both inlet ports are in open communication with outlet to a position in which there is no communication from either inlet port to outlet, said fluid pressure responsive means defining a pressure chamber the fluid pressure in which is operable to urge the control member towards a fluid flow closing position and comprising one way valving means which provides for individual fluid communication from each of the inlet ports to said pressure chamber whereby the fluid pressure in said pressure chamber is provided by the higher of the two inlet pressures.

2. A fluid mixing valve according to claim 1, wherein the one way valving means comprises an annular cup seal permitting fluid flow therepast in one direction only.

3. A fluid flow control valve according to claim 2, wherein the body chamber has an internal surface and the fluid control member has an external surface to define an annular space therebetween and the annular seal has radially inner and outer lips cooperating respectively with the said internal surface of the body chamber and said external surface of the fluid control member to permit fluid flow from the respective inlets to the pressure chamber whereby the servo chamber pressure will be supplied by the higher of the pressures from the two inlets.

4. A fluid flow control valve according to claim 1, comprising a closable vent provided from the pressure chamber to outlet, the vent being closed in the shut-off condition of the valve.

5. A fluid flow control valve according to claim 4, including pressure responsive means for maintaining the vent closed.

6. A fluid flow control valve according to claim 4, including pressure responsive means whereby inlet pressure is operable to urge the fluid flow control member to a valve opening position when the pressure servo chamber is vented to outlet.

7. A fluid flow control valve according to claim 4, including a rotatable and axially movable control rod extending into the body through the pressure chamber to engage the control member for controlling movement thereof.

8. A fluid flow control valve according to claim 7, including a connection between the control rod and the control member such as to provide a rotational drive from the control rod to the control member whilst permitting only limited relative axial movement of the control member and the control rod.

9. A fluid flow control valve according to claim 8, wherein the vent is opened and closed responsive to such relative axial movement of the control rod relative to the control member.

10. A fluid flow control valve according to claim 1, including fluid pressure control means provided for resisting rapid movement of the control member to its flow closing position.

11. A fluid flow control valve according to claim 10, including a movement damping chamber defined between the body and the control member such that closing of the control member reduces the size of such damping chamber, a discharge aperture from such chamber and so arranged as to permit only a restricted flow of liquid from the damping chamber towards the end of closing movement of the control member to damp liquid flow through the aperture so that final closing movement of the control member is itself resisted.

12. A fluid flow control valve according to claim 1, wherein two outlets are provided and which includes a seal provided between the body and the fluid flow control member between said outlets whereby mixing of fluid from the two inlets is prevented prior to discharge through respective ones of the outlets.

13. A fluid flow control valve comprising a body defining a chamber therein and having two inlet ports and at least one outlet port communicating with said chamber therein; a control member axially movable within the chamber to open and close communication from the inlet ports to outlet and rotatable to control the relative rate of flow through the individual inlet ports; and fluid pressure responsive means operable by supply fluid pressure from at least one of the inlet ports for providing a servo action to assist axial movement of the control member from a position in which both inlet ports are in open communication with outlet to a position in which there is no communication from either inlet port to outlet, said fluid pressure responsive means defining a pressure chamber the fluid pressure in which is operable to urge the control member towards a fluid flow closing position and comprising one way valving means which provides for fluid communication from each of the inlets to said pressure chamber, said one way valving means comprising an annular cup seal permitting fluid flow therepast in one direction only.

14. A fluid flow control valve according to claim 13, wherein the body chamber has an internal surface and the fluid control member has an external surface to define an annular space therebetween and the annular seal has radially inner and outer lips cooperating respectively with the said internal surface of the body chamber and said external surface of the fluid control member to permit fluid flow from the respective inlets to the pressure chamber whereby the servo chamber pressure will be supplied by the higher of the pressures from the two inlets.

15. A fluid flow control valve according to claim 13, wherein two outlets are provided and which includes a seal provided between the body and the fluid flow control member between said outlets whereby mixing of fluid from the two inlets is prevented prior to discharge through respective ones of the outlets.

16. A fluid flow control valve according to claim 13, including fluid pressure control means provided for resisting rapid movement of the control member to its flow closing position.

17. A fluid flow control valve according to claim 16, including a movement damping chamber defined between the body and the control member such that closing of the control member reduces the size of such damping chamber, a discharge aperture from such chamber and so arranged as to permit only a restricted flow of liquid from the damping chamber towards the end of closing movement of the control member to damp liquid flow through the aperture so that final closing movement of the control member is itself resisted.

18. A fluid flow control valve comprising a body defining a chamber therein and having two inlet ports and at least one outlet port communicating with said chamber therein; a control member axially movable within the chamber to open and close communication from the inlet ports to outlet and rotatable to control the relative rate of flow through the individual inlet ports; fluid pressure responsive means operable by supply fluid pressure from at least one of the inlet ports for providing a servo action to assist axial movement of the control member from a position in which both inlet ports are in open communication with outlet to a position in which there is no communication from either inlet port to outlet, said fluid pressure responsive means defining a pressure chamber the fluid pressure in which is operable to urge the control member towards a fluid flow closing position and comprising one way valving means which provides for fluid communication from each of the inlets to said pressure chamber and a closable vent provided from the pressure chamber to outlet, the vent being closed in the shut-off condition of the valve; and a rotatable and axially movable control rod extending into the body through the pressure chamber to engage the control member for controlling movement thereof, there being provided a connection between the control rod and the control member such as to provide a rotational drive from the control rod to the control member whilst permitting only limited relative axial movement of the control member and the control rod.

19. A fluid flow control valve according to claim 18, including pressure responsive means for maintaining the vent closed.

20. A fluid flow control valve according to claim 18, including pressure responsive means whereby inlet pressure is operable to urge the fluid flow control member to a valve opening position when the pressure servo chamber is vented to outlet.

21. A fluid flow control valve according to claim 18, wherein the vent is opened and closed responsive to such relative axial movement of the control rod relative to the control member.

* * * * *